April 2, 1968  A. N. MILSTER  3,375,852
CONTROL VALVE

Filed June 21, 1965  2 Sheets-Sheet 1

INVENTOR
ARTHUR N. MILSTER
BY
Joseph E. Papin.

April 2, 1968     A. N. MILSTER     3,375,852
CONTROL VALVE

Filed June 21, 1965                                2 Sheets-Sheet 2

INVENTOR
ARTHUR N. MILSTER
BY
*Joseph E. Papin*

United States Patent Office 3,375,852
Patented Apr. 2, 1968

3,375,852
CONTROL VALVE
Arthur N. Milster, Richmond Heights, Mo., assignor to Wagner Electric Corporation, St. Louis, Mo., a corporation of Delaware
Filed June 21, 1965, Ser. No. 465,503
13 Claims. (Cl. 137—493.3)

ABSTRACT OF THE DISCLOSURE

In a proportioning valve, first resiliently urged means movable to isolate the output fluid pressure from the input fluid pressure when the magnitudes thereof attain a predetermined value, and other resiliently urged means movable in response to input fluid pressure in excess of the predetermined value for communicating the input fluid pressure with the output fluid pressure and also movable toward an inoperative position effecting open pressure fluid communication between the input and output fluid pressures when the magnitude of the output fluid pressure acting thereon attains another predetermined value predeterminately greater than the first named predetermined value.

---

Figure 1:
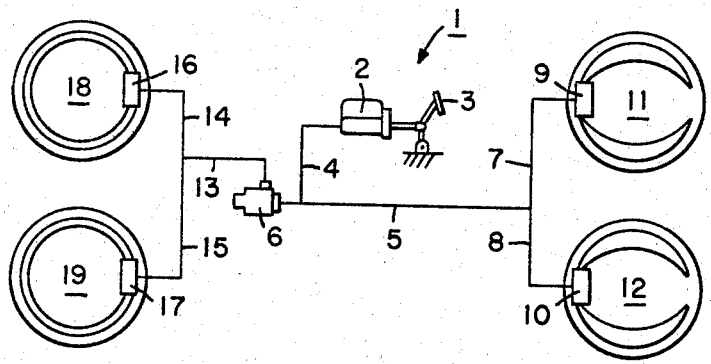

This invention relates to fluid pressure systems and more particularly to a control valve for use in such fluid pressure systems.

In the past, vehicles have been provided with a pair of dissimilar axle sets of friction devices actuated in response to fluid pressure applied thereto from the vehicle fluid pressure system, and each axle set of said friction devices respectively required actuating fluid pressures of different magnitudes for initial friction device energization. One of the undesirable or disadvantageous features of such past vehicle fluid pressure systems was the time lag between the initial energization of one of the axle sets of friction devices relative to the other set thereof. For example, in a vehicle fluid pressure system having one axle set of disc type friction devices and the other axle set of expandable shoe and drum type friction devices, the fluid pressure required to overcome the inherent resistances of the disc type friction devices to effect initial energization thereof was relatively less than the fluid pressure required to overcome the inherent resistances of the expandable shoe and drum type friction devices to effect initial energization thereof, and in this manner, the undesirable time lag between initial energization of the dissimilar friction devices occurred.

It is, therefore, a general object of the present invention to provide a control valve for overcoming the aforementioned undesirable or disadvantageous feature.

Another object of the present invention is to provide a control valve for effecting substantially simultaneous initial friction device energization between dissimilar types of vehicle axle friction devices.

Another object of the present invention is to provide a novel control valve for use in a vehicle fluid pressure system having dissimilar sets of axle friction devices, which controls the flow of displaced pressure fluid for effecting substantially simultaneous actuation of the dissimilar sets of axle friction devices.

Another object is to provide a novel control valve initially permitting pressure fluid flow to dissimilar axle sets of friction devices, which in response to a fluid pressure sufficient to initially energize one set of said axle friction devices interrupts pressure fluid flow thereto and in response to the attainment of a fluid pressure sufficient to initially energize the other set of said axle friction devices establishes pressure fluid flow to said one set of axle friction devices for substantially simultaneous energization with said other set of axle friction devices.

Another object of the present invention is to provide a control valve which interrupts pressure fluid flow to one set of axle friction devices upon initial energization thereof and re-establishes pressure fluid flow to said one set of axle friction devices in response to the fluid pressure attaining a value sufficient to initially energize the other set of axle friction devices to effect substantially simultaneous actuation thereof.

Still another object is to provide a control valve for use in a vehicle pressure fluid system to control the energization of disc type friction devices on one vehicle axle and conventional shoe and drum type friction devices on another vehicle axle, said control valve closing pressure fluid flow to said disc type friction devices in response to fluid pressure in the pressure fluid system attaining a value sufficient for initial energization thereof and re-opening pressure fluid flow to said disc type friction devices upon the fluid pressure in the pressure fluid system attaining a value sufficient for initial energization of said shoe and drum type friction devices to thereafter establish pressure fluid flow in the pressure fluid system to said disc type friction device and said shoe and drum type friction device for substantially simultaneous actuation thereof.

Still another object of the present invention is to provide a novel control valve of simplified construction and economy of manufacture.

These and other objects and advantages will become apparent hereinafter.

Briefly, the present invention embodies a control valve having a housing, a pair of resiliently urged means in said housing normally permitting pressure fluid flow therethrough, one of said resiliently urged means being responsive to a predetermined fluid pressure to interrupt pressure fluid flow through said housing, and said other resiliently urged means being thereafter responsive to fluid pressure predeterminately greater than the predetermined fluid pressure to re-establish pressure fluid flow through said housing.

Figure 2:
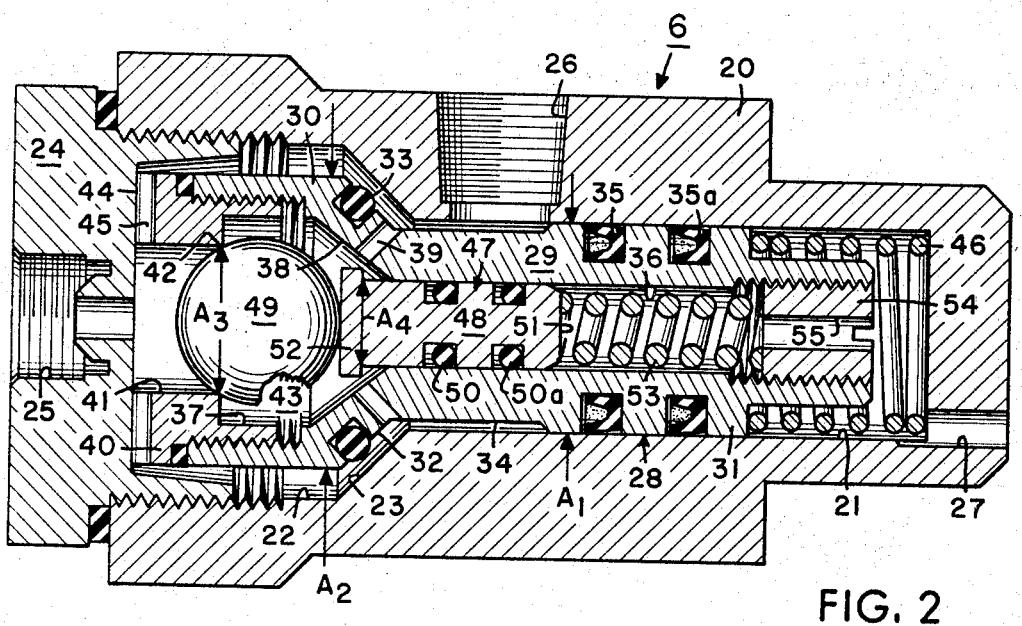
Figure 3:
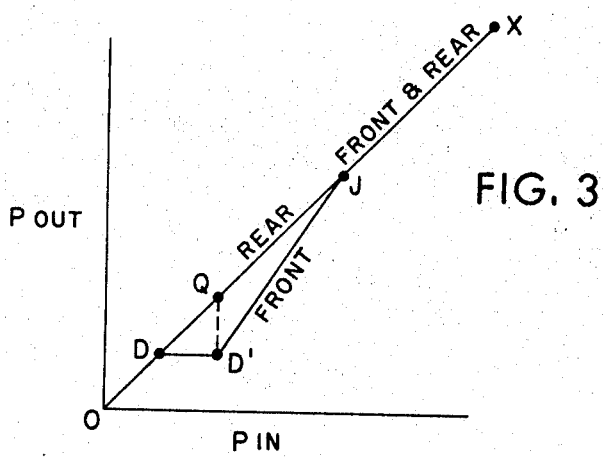
Figure 4:
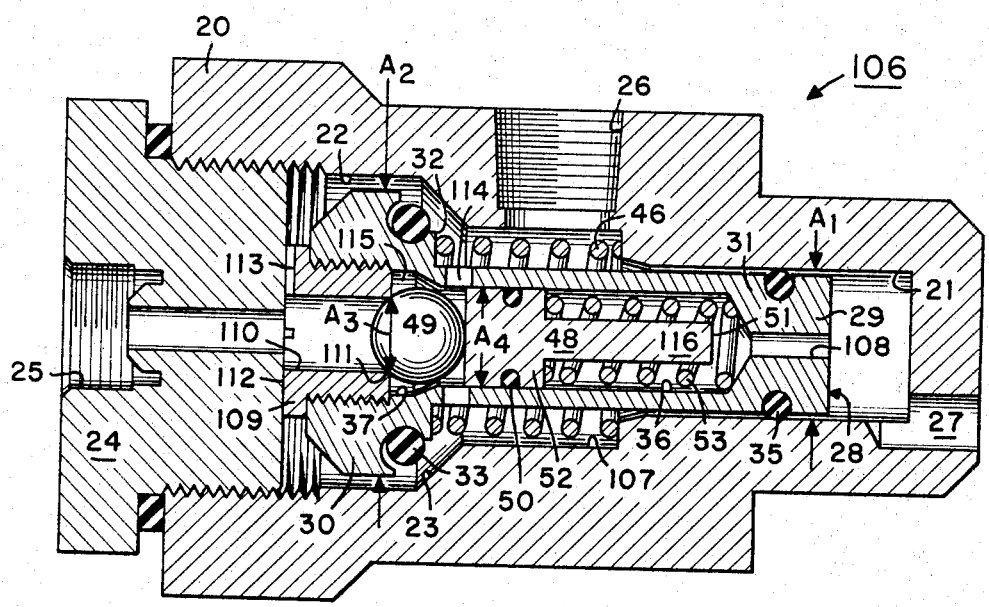
Figure 5:
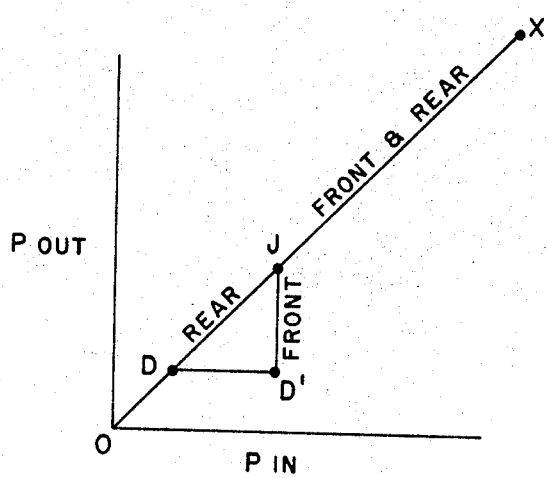

In the drawings which illustrate embodiments of the present invention:

FIG. 1 is a diagrammatic view of a fluid pressure system having a control valve therein embodying the present invention, FIG. 2 is a sectional view showing the control valve of FIG. 1 in cross-section, FIG. 3 is a graphic representation of the fluid pressure as effected by the embodiment of the control valve as shown in FIG. 2, FIG. 4 is a sectional view showing another control valve embodying the present invention and for use in the fluid pressure system of FIG. 1 in cross-section, and FIG. 5 is a graphical representation of the fluid pressure as effected by the control valve of FIG. 4.

Referring to the drawings in detail and in particular to FIG. 1, a fluid pressure system for a vehicle, indicated generally at 1, is provided with fluid pressure generating means or a master cylinder 2 which is manually actuated by brake pedal 3 operatively connected therewith. A delivery conduit 4 is connected between the master cylinder 2 and a conduit 5 which has one end connected to the inlet port of a control or pressure inhibiting valve 6 and the other end thereof branches at 7, 8 for connection with servo motors or wheel cylinders 9, 10 of rear wheel brake assemblies 11, 12. Another conduit 13 has one end connected to the outlet port of the control valve 6 and the other end thereof branches at 14, 15 for connection with actuators 16, 17 of the front wheel brake assemblies 18, 19. To complete the description of the system 1, it should be noted that the rear and front wheel brake assemblies 11, 12 and 18, 19 are of different types requiring different actuating pressures to effect the initial energization thereof.

Referring now to FIG. 2, the control valve 6 is provided with a housing 20 having an axially aligned bore 21 and counterbore 22 therein, and a tapering radial shoulder or valve seat 23 is provided at the intersection of said bore and counterbore. The rightward end of the bore 21 is closed by the housing 20, and the leftward end of the counterbore 22 is closed by a closure member 24 threadedly received therein. An inlet port 25 which receives the conduit 5, as previously mentioned, is provided in the closure member 24 and connects with the leftward end of the housing counterbore 22, and an outlet port 26 which receives the conduit 13, as previously mentioned, is also provided in said housing intersecting with the housing bore 21 adjacent to the valve seat 23. A venting passage 27 is also provided in the housing 20 intersecting with the housing bore 21 adjacent to the end wall thereof.

A valve or piston member, indicated generally at 28, is provided with a body portion 29 having an enlarged head portion 30 coaxial with the housing counterbore 22 and an integrally formed reduced extension or stem portion 31 slidable in the housing bore 21, and a radially extending shoulder 32 is provided at the intersection of said head and extension portions, said shoulder having a peripheral seal or valve element 33 disposed therein for sealing engagement with the housing valve seat 23. A peripheral groove or annular recess 34 is provided in the valve body extension 31 between the rightward or free end thereof and the shoulder 32 juxtaposed with the outlet port 26, and spaced peripheral seals 35, 35a are disposed in said valve body extension for sealing engagement with the housing bore 21 between the end wall thereof and said outlet port. The valve body 29 is also provided with an axially aligned bore and counterbore 36, 37 therethrough, and another radially extending shoulder 38 is defined at the juncture of said valve body bore and counterbore. A plurality of passages 39 are provided in the valve body 29 having one end intersecting with the shoulder 38 and the other end thereof intersecting with groove 34 adjacent to the shoulder 32 and rightwardly of the valve seal 33. A plug or valve seating member 40 is threadedly received in the leftward end of the valve body counterbore 37, and a passage 41, which is stepped at 42 to define an annular shoulder or valve seat therein, is axially provided through said plug connecting said valve body counterbore in pressure fluid communication with the housing counterbore 22 and the inlet port 25. It should be noted that the valve body counterbore 37 and the passages 39, 41 define a by-pass passage, indicated generally at 43, through the valve body 29 between the inlet and outlet ports 25, 26 (to be discussed hereinafter). The plug 40 is provided with a leftward or abutment end 44 for abutting engagement with the closure member 24, and a plurality of cross-passages or radially extending grooves 45 are provided in said abutment end between the stepped passage 41 and the peripheral portion of said plug for pressure fluid flow purposes. A return spring 46 is biased between the rightward or free end of the valve body extension 31 and the end wall of the housing bore 21 normally urging the valve body 29 leftwardly toward an inoperative or pressure fluid flow passing position disengaging the valve seal 33 from the housing valve seat 23 and engaging the abutment end 44 of the plug 40 with the closure member 24.

Another valve member, indicated generally at 47, is provided with a stem portion or piston member 48 slidable in the valve body bore 36 and a sealing element or displaceable ball 49 in the valve body counterbore 37. The piston member 48 is provided with peripheral seals 50, 50a for sealing engagement with the valve body bore 36 and opposed end portions 51, 52. A spring member 53 is adjustably pre-compressed between the piston member rightward end 51 and an adjustable retaining member 54 threadedly received in the rightward end of the valve body bore 36, said retaining member having a vent passage 55 therethrough connecting the valve body bore 36 rightwardly of the piston member 48 in pressure fluid communication with the housing bore 21 and the atmospheric passage 27. To complete the description of the control valve 6, the leftward or abutment end 52 of the piston member 48 extends coaxially into the valve body counterbore 37 into abutting engagement with the ball 49, and the compressive force of the spring 53 concertedly urges said piston member and ball leftwardly toward a normal inoperative or pressure fluid flow interrupting position wherein said ball is engaged with the valve seat 42 to close the by-pass passage 43.

In the operation with the component parts of the system 1 and control valve 6 in their normal inoperative positions, as described hereinbefore and as shown in FIGS. 1 and 2, a manually applied force on the brake pedal 3 displaces pressure fluid from the master cylinder 2 through the conduits 4, 5, 7, 8 into the wheel cylinders 9, 10 to effect energization of the rear wheel brake assemblies 11, 12. The displaced pressure fluid also flows from the conduit 5 through the inlet port 25 of the control valve 6, the housing counterbore 22, the cross-grooves 45 of the valve body plug 40, between the valve body head 30 and the side wall of said housing counterbore and between the valve body peripheral groove 34 and the side wall of the housing bore 21 into the outlet port 26. The displaced pressure fluid flows from the outlet port 26 through the conduits 13, 14, 15 into the wheel cylinders 16, 17 to effect energization of the front wheel brake assemblies 18, 19. Since it is assumed that the rear wheel brake assemblies 11, 12 have greater inherent resistances than those of the front wheel brake assemblies 18, 19 due to the design thereof, it follows that said front wheel brake assemblies will be initially energized in response to a fluid pressure which is predeterminately less or smaller than that required to effect the initial energization of said rear wheel brake assemblies.

Referring now also to FIG. 3, when the input and output fluid pressures $P_i$ and $P_o$ at the inlet and outlet ports 25, 26 attain a predetermined value D acting on the effective area $A_1$ of the valve member 29, a force $F_1$ is established urging said valve member rightwardly toward an operative position against the compressive force $F_s$ of the spring 46. This rightward movement sealably engages the valve seal 33 of the valve member 29 with the housing shoulder 32 to interrupt pressure fluid communication between the inlet and outlet ports 25, 26. With the valve element 33 seated, the input fluid pressure $P_i$ acts on the effective area $A_2$ of the valve body head 30 which is defined by said valve element to create a force $F_2$ also urging the valve member 29 rightwardly to maintain the sealing engagement of said sealing element with the housing valve seat 32, and the output fluid pressure $P_o$ is effective through the valve body passages 39 and the valve body counterbore 37 acting on the effective areas $A_3$, $A_4$ of the ball 49 and piston member 48 therein to establish oppositely acting forces $F_3$, $F_4$. The force $F_3$ is additive to the compressive force $F_c$ of the pre-compressed spring 53 urging the ball 49 toward engagement with the plug valve seat 42 in the valve body 29, and the force $F_4$ opposes the spring force $F_c$. It should also be noted that the input fluid pressure $P_i$ also acts on the effective area $A_3$ of the ball 49 creating a force $F_5$ additive to the force $F_4$ and in opposition to the force $F_3$ and the spring force $F_c$.

With the valve member 29 in its operative position interrupting pressure fluid communication between the inlet and outlet ports 25, 26, as above described, further actuation of the master cylinder 2 to increase the input fluid pressure $P_i$ results, of course, in a corresponding increase in the magnitude of the force $F_5$, and since said valve member is in its operative sealing position, the output fluid pressure $P_o$ remains constant at the predetermined value D. When the input fluid pressure $P_i$ is increased to a value Q predeterminately greater than the value D of the output fluid pressure $P_o$, the increased force $F_5$ plus the force $F_4$ overcomes the opposing forces $F_3$ and the force $F_c$ of the spring 53 to move the ball 49 rightwardly to a position disengaged from the plug valve seat 42 thereby opening the by-pass passage 43 to allow additional fluid pressure to pass therethrough to the outlet port 26. As a result of the by-pass passage 43 opening, an increase in the output fluid pressure $P_o$ occurs which, due to the relationship of the effective areas $A_3$ and $A_4$, predeterminately increases the force $F_3$ more than the force $F_4$, so that forces $F_c$ and $F_3$ overcome the opposing forces $F_5$ and $F_4$ to again concertedly move the piston 48 and ball 49 leftwardly toward their original inoperative positions to sealably re-engage said ball with the plug valve seat 42 closing the by-pass passage 43. It should be noted that since the opposing forces $F_3$ and $F_5$ are established by the input and output fluid pressures $P_i$ and $P_o$ respectively acting on the effective area $A_3$, a predetermined fluid pressure differential would normally be maintained on opposite sides of the ball 49 due to the relatively constant force $F_c$ of spring 53 acting thereon. However, the force $F_c$ is opposed across the piston 48 by the force $F_4$ which incrementally increases each time the by-pass passage 43 is opened, reducing the effect of the force $F_c$ on the ball 49 and thereby incrementally decreasing the fluid pressure differential established between input and output fluid pressures $P_i$ and $P_o$ on opposite sides of said ball. Therefore, further incremental increases in the input fluid pressure $P_i$ will effect further actuation of the ball 49 to open and close the by-pass passage 43 resulting in further incremental increases in the output fluid pressure $P_o$ and force $F_4$ so that the force differential of the opposing forces $F_4$, $F_5$ and $F_3$, $F_c$ acting across the ball 49 is also correspondingly decreased in increments; therefore, it is apparent that incremental increase in the input fluid pressure $P_i$ required to actuate said ball becomes progressively smaller as the magnitude of the input fluid pressure $P_i$ increases. When the magnitude of the input fluid pressure $P_i$ is increased to a value J predeterminately greater than the predetermined value D thereof, the valve element 49 is again disengaged from its seat 42, as discussed hereinbefore, increasing the force $F_4$ to a magnitude balancing that of the opposing relatively constant force $F_c$ of the spring 53 to re-establish pressure fluid communication between the inlet and outlet ports 25, 26, and equalize the input and output fluid pressures $P_i$, $P_o$. Upon movement of the valve element 49 to its open or operative position with the forces $F_4$ and $F_c$ balanced and the forces $F_3$ and $F_5$ eliminated due to the equalized input and output fluid pressures $P_i$ and $P_o$, the force differential across said valve element is equalized, and said valve element will thereafter remain in the open position thereof in response to established open pressure fluid communication through the by-pass passage 43 between the inlet and outlet ports 25, 26; therefore, it is apparent that any increase in the input fluid pressure $P_i$ in excess of the predetermined value J results in an equal increase in the output fluid pressure $P_o$ with the magnitudes thereof equal to effect a direct proportion between the intensities of the braking applications at the rear and front wheel brake assemblies 11, 12 and 18, 19.

When the desired braking application is obtained, the manually applied force is removed from the brake pedal 3 to permit the return flow of displaced pressure fluid to the master cylinder 2 which serves to exhaust or eliminate the input and output fluid pressures $P_i$, $P_o$. The elimination of the input and output fluid pressures $P_i$, $P_o$, of course, effects the elimination of the forces $F_2$ and $F_4$ permitting the force $F_c$ of the spring 53 to return the piston 48 and ball 49 to their original inoperative positions to re-engage said ball with its seat 42 closing the by-pass passage 43 and also permitting the force $F_s$ of the spring 46 to return the valve member 28 to its original position disengaging the valve element 33 thereof from the housing shoulder 23 and engaging the abutment end 44 of the plug 41 with the closure member 24. With the valve member 28 in its inoperative position, the return flow of displaced fluid pressure is effected to de-energize the front wheel brake assemblies 18, 19 from the wheel cylinders 16, 17 thereof through conduits 14, 15 and 13 to the outlet port 26 of the control valve 6 and therefrom through the peripheral groove 34 of the valve body extension 31, between the valve body head 30 and the housing counterbore 22, and through the plug cross-passage 45 into the inlet port 25. The return flow of displaced pressure fluid flows from the inlet port 25 through conduits 5 and 4 back into the master cylinder 2, and at the same time, displaced fluid pressure is also returned to said master cylinder through the conduits 7, 8, 5 and 4 from the wheel cylinders 9, 10 to effect substantially simultaneous de-energization of the rear wheel brake assemblies 11, 12.

As illustrated by the graphical representation of the braking pressure of FIG. 3, until the displaced pressure fluid attains the value D, the output fluid pressure $P_o$ from the control valve 6 to the front brakes 18, 19 is in direct proportion, i.e., a 1:1 ratio, with the input fluid pressure $P_i$ to the rear brakes 11, 12, as shown by the line OD. This predetermined fluid pressure D is equivalent to the fluid pressure required to overcome the inherent resistances of the front brakes 18, 19 and effect initial energization thereof. When this predetermined fluid pressure D is attained, the valve member 28 has moved rightwardly to sealably engage the valve element 33 thereof with its valve seat 23 interrupting pressure fluid communication between the inlet and outlet ports 25, 26 of the control valve 6 as well as between the rear and front brakes 11, 12 and 18, 19. The output fluid pressure $P_o$ to the front brakes 18, 19 remains substantially constant, as shown by the line DD', while the input fluid pressure $P_i$ to the rear brakes 11, 12 is increased, as shown by the line DQ. When the input fluid pressure $P_i$ attains the value Q, which is the fluid pressure required to overcome the inherent resistances of the rear brakes 11, 12, the incremental fluid pressure bypassing operation of the control valve 6 is effected providing a proportional increase between the input and output fluid pressures $P_i$, $P_o$ as evidenced by the lines QJ and D'J, respectively. In other words, a predetermined incremental increase in the input fluid pressure $P_i$, as shown by the line QJ, occasions a predetermined incremental increase in the output fluid pressure $P_o$, as shown by the line D'J, and the value J is the fluid pressure at which the force $F_c$ of the control valve spring 53 is overcome to effect uninterrupted open pressure fluid communication between the control valve inlet and outlet ports 25, 26. Thereafter, any further increase in the pressure fluid in the braking system 1 is simultaneously effective at the rear and front brakes 11, 12 and 18, 19, as shown by the line JX.

Referring now to FIG. 4, another control or fluid pressure inhibiting valve 106 is shown having substantially the same component parts and functioning in the system 1 substantially in the same manner as the previously described control valve 6 with the following exceptions.

The control valve 106 is provided with an intermediate bore 107 in the housing 20 which is coaxially interposed between the housing bore and counterbore 21, 22, said intermediate bore being intersected by the outlet port 26 and said housing shoulder or valve seat 23 being formed at the juncture of said housing intermediate bore and counterbore. A venting passage 108 is axially provided through the rightward end of the valve body extension 31 connecting the valve body bore 36 rightwardly of the piston 48 therein in open pressure fluid communication with housing atmospheric passage 27 and the housing bore 21 rightwardly of the valve body extension 31 therein. A plug or valve seating member 109 is threadedly received in the leftward end of the valve body counterbore 37, and a passage 110 is axially provided through said plug defining at 111 an annular shoulder or valve seat for cooperative engagement with the ball 49. The plug 109 is provided with a leftward or abutment end 112 for engagement with the closure member 24 and a plurality of radial grooves 113 are provided in said abutment end for pressure fluid flow between the passage 110 and the periphery of said plug. A plurality of radially extending passages 114 are provided through the valve body extension 31 connecting the valve body bore 36 leftwardly of the piston 48 therein with the housing intermediate bore 107, and the return spring 46 is positioned in said housing intermediate bore in concentric relation with said valve body extension between the valve body shoulder 32 and the housing shoulder formed at the juncture of the housing bore and intermediate bore 21, 107. It should be noted that the valve body counterbore 37 and the passages 110, 114 define a by-pass passage 115 in the valve body 29 between the inlet and outlet ports 25, 26. To complete the description of the control valve 106, a spring guide extension 116 is integrally provided on the rightward end 51 of the piston member 48 in concentric relation with the spring 53, said spring guide extension having a free end for abutment with the valve body extension 31 defining the rightward end wall of the valve body bore 36 to predeterminately limit the rightward movement of said piston member in said valve body bore.

In the operation, it should be noted that the effective fluid pressure responsive area $A_3$ provided on the ball valve 49 is substantially the same size or predeterminately smaller than the effective fluid pressure responsive area $A_4$ defined by the leftward end 52 of the piston member 48. When the force $F_5$ established by the input fluid pressure $P_i$ acting on the effective area $A_3$ of the ball valve 49 plus the force $F_4$ established by the output fluid pressure $P_o$ acting on the effective area $A_4$ is sufficient to overcome the opposing spring force $F_c$ plus the force $F_3$ established by the output fluid pressure $P_o$ acting on the effective area $A_3$, the ball valve 49 is moved rightwardly toward its operative position disengaged from the plug valve seat 111 to open the by-pass passage 115 and since the effective area $A_4$ is predeterminately greater than the effective area $A_3$, the force $F_4$ is increased to a value predeterminately greater than the force $F_5$; therefore, the force $F_c$ of spring 53 is balanced and ineffective to re-engage the ball valve 49 with its seat 111 to close said by-pass passage and the input and output fluid pressures $P_i$ and $P_o$ are equalized. In this manner, uninterrupted pressure fluid flow between the inlet and outlet ports 25, 26 is re-established through said by-pass passage 115.

As illustrated by the graphical representation of braking pressure in FIG. 5, the control valve 106 provides for the establishment of the output fluid pressure $P_o$ at the front wheel brake assemblies 18, 19 in direct proportion, i.e., a 1:1 ratio, to the input pressure $P_i$ at the rear wheel brake assemblies 11, 12 until a predetermined fluid pressure D is attained, as shown by the line OD'. This predetermined fluid pressure D is equivalent to the fluid pressure required to overcome the inherent resistances of the front wheel brake assemblies 18, 19 and effect the initial energization thereof. When this predetermined fluid pressure D is attained, the valve member 28 has moved rightwardly to sealably engage the valve element 33 thereof with its valve seat 23 interrupting pressure fluid communication between the inlet and outlet ports 25, 26 of the control valve 106, as well as the rear and front wheel brake assemblies 11, 12 and 18, 19, and effecting a pressure fluid differential between the input fluid pressure $P_i$ and the output fluid pressure $P_o$. As the input fluid pressure $P_i$ is increased, as shown by the line DJ, the output fluid pressure $P_o$ remains substantially constant, as shown by the line DD'. The predetermined fluid pressure J is equivalent to the fluid pressure required to overcome the inherent resistances of the rear wheel brake assemblies 11, 12. When the input fluid pressure $P_i$ is increased to the value J, the additive forces $F_4$, $F_5$ overcome the opposing additive forces $F_3$, $F_c$ to move the ball valve 49 from its valve seat 111 and open the by-pass passage. Since the force $F_4$ is predeterminately greater than the force $F_c$ due to the area size relationship of effective areas $A_3$, $A_4$, as previously mentioned, the by-pass passage 115 remains opened to provide uninterrupted pressure fluid flow between the inlet and outlet ports 25, 26, and the pressure fluid differential between the input fluid pressure $P_i$ and output fluid pressure $P_o$ is eliminated, as shown by the line D'J. Thereafter, the control valve 106 allows the output fluid pressure $P_o$ to be maintained at the front wheel brake assemblies 18, 19 in direct proportion, i.e., a 1:1 ratio, to the input fluid pressure $P_i$ at the rear wheel brake assemblies 11, 12, as shown by the line JX, and in this manner, the initial energization of said front and rear wheel brake assemblies is effected substantially simultaneously.

From the foregoing, it is now apparent that novel control valves 6, 106 meeting the objects and advantages set out hereinbefore, as well as other objects and advantages apparent in the disclosure, are provided and that changes or modifications as to the precise configurations, shapes and details of the constructions set forth in said disclosure by way of illustration may be made by those skilled in the art without departing from the spirit of the invention, as defined by the claims which follow.

The embodiments of the invention in which an exclusive property or privilege is claimed are defined as follows:

1. A control valve comprising a housing having a bore therein, inlet and outlet ports in said housing connected to said bore, a valve seat on said housing intermediate said inlet and outlet ports, first valve means including a body portion slidable in said bore and a head portion connected thereto for engagement with said valve seat, first resilient means biased between said housing and said first valve means normally urging said head portion toward a position disengaged from said valve seat to establish pressure fluid communication through said bore between said inlet and outlet ports, said first valve means being movable in response to a predetermined fluid pressure at said inlet and outlet ports to a position engaging said head portion with said valve seat and interrupting pressure fluid communication therebetween, passage means in said first valve means for connection between said inlet and outlet ports, second valve means movable in said passage means and controlling pressure fluid communication therethrough, valve control means movable in said housing and extending into said passage means for engagement with said second valve means, and second resilient means normally urging said valve control means into engagement with said second valve means and urging said second valve means toward a position interrupting pressure fluid communication between said inlet and outlet ports through said passage means, said second valve means being movable against said valve control means and said second resilient means in response to fluid pressure at said inlet port in excess of the predetermined fluid pressure toward a position in said passage means re-establishing pressure fluid communication therethrough between said inlet and outlet ports and said valve control means being movable against said resilient means toward a position disengaged from said second valve means and unopposed to further movement thereof in response to another predetermined fluid pressure at said outlet port predeterminately greater than the first named predetermined fluid pressure upon the closure of said first valve means.

2. A control valve comprising a housing having a counterbore and bore therein, inlet and outlet ports in said housing respectively connected to said counterbore and bore, a valve seat on said housing at the juncture of said counterbore and bore, first valve means controlling pressure fluid communication between said inlet and outlet ports including a body portion slidable in said bore and a head portion extending into said counterbore for engagement with said valve seat, first resilient means normally urging said head portion toward a position disengaged from said valve seat to establish pressure fluid communication between said inlet and outlet ports, said first valve means being movable in response to a predetermined fluid pressure at said inlet and outlet ports to a position engaging said head portion with said valve seat and interrupting pressure fluid communication between said inlet and outlet ports, passage means in said first valve means for connection between said inlet and outlet ports, another valve seat on said first valve means in said passage means, second valve means controlling pressure fluid communication between said inlet and outlet ports including a ball in said passage means for engagement with said other valve seat, a valve control member movable in said passage means for driving engagement with said ball, and second resilient means normally urging said valve control member into driving engagement with said ball to normally maintain said ball in sealing engagement with said other valve seat interrupting pressure fluid communication through said passage means, said ball being movable against said valve control member and said second resilient means in response to fluid pressure at said inlet port predeterminately in excess of the predetermined fluid pressure to a position disengaged from said other valve seat and establishing pressure fluid communication between said inlet and outlet ports through said passage means when said first valve means is engaged with said housing valve seat and said valve control member also being movable against said second resilient means to a position disengaged from said ball in response to another predetermined fluid pressure at said outlet port predeterminately greater than said first named predetermined fluid pressure when said first valve means is engaged with said housing valve seat.

3. A control valve comprising a housing having a pair of spaced ports therein, resiliently urged means movable in said housing and defining therewith a normally open pressure fluid flow passage between said ports, said resiliently urged means being movable in response to a predetermined fluid pressure at said ports to a position in said housing closing said flow passage and interrupting pressure fluid communication between said ports, by-pass passage means in said resiliently urged means for controlling pressure fluid communication between said ports when said flow passage is closed including a stepped passage defining a valve seat and having one end thereof connected in pressure fluid communication with one of said ports, another passage connecting the other end of said stepped passage in pressure fluid communication with the other of said ports, valve means for engagement with said valve seat, piston means movable in said resiliently urged means and extending into said stepped passage for engagement with said valve means, and spring means urging said piston means in a direction to normally engage said valve means with said other valve seat to interrupt pressure fluid communication through said by-pass passage means, said valve means being movable against said piston means and spring means in response to fluid pressure at said one port in excess of the predetermined fluid pressure toward a position disengaged from said valve seat and establishing pressure fluid communication between said one and other ports through said by-pass passage means, and said piston means being responsive to another predetermined fluid pressure at said ports in excess of the first named predetermined fluid pressure to disable said spring means.

4. A control valve comprising a housing having an axial counterbore and bore therein, inlet and outlet ports in said housing respectively connected to said counterbore and bore, a valve seat on said housing at the juncture of said bore and counterbore, piston means including a body portion slidable in said bore and a head portion connected thereto extending into said counterbore, means on said head portion defining a valve element for engagement with said valve seat, first resilient means biased between said housing and said piston means normally urging said valve element to a position disengaged from said valve seat to establish pressure fluid communication between said inlet and outlet ports, said piston means being movable in response to a predetermined fluid pressure at said inlet and outlet ports to a position engaging said valve element with said valve seat to interrupt pressure fluid communication between said inlet and outlet ports, by-pass passage means in said piston means for controlling pressure fluid communication between said inlet and outlet ports when said valve element is engaged with said valve seat including an axial passage in said head portion, said passage having one end connected in pressure fluid communication with said inlet port on one side of said valve element, a radially extending passage in said piston means connecting the other end of said axial passage in pressure fluid communication with the outlet port on the other side of said valve element, another valve seat on said head portion in circumscribing relation with said axial passage, a ball in said axial passage for engagement with said other valve seat, other piston means slidable in said body portion and extending into said axial passage for engagement with said ball, and second resilient means urging said other piston means in a direction to normally engage said ball with said other valve seat interrupting pressure fluid communication through said by-pass passage means, and said ball being movable against said other piston means and second resilient means in response to fluid pressure at said inlet port in excess of the predetermined fluid pressure to a position disengaged from said other valve seat and establishing pressure fluid communication between said inlet and outlet ports through said by-pass passage means, and said other piston means being movable in response to fluid pressure at said outlet port in excess of a predetermined magnitude to overcome the opposing force of said spring means.

5. A control valve comprising a housing, a pair of resiliently urged means concertedly and relatively movable in said housing for effecting the application through said housing of fluid pressure supplied thereto, said resiliently urged means being concertedly movable in response to supplied fluid pressure of a predetermined value toward a pressure fluid flow interrupting position in said housing isolating the applied fluid pressure from the supplied fluid pressure, said resiliently urged means defining by-pass passage means therebetween for communicating the supplied and applied fluid pressures following movement of said resiliently urged means to the flow interrupting position, one of said resiliently urged means being thereafter movable relative to the other thereof in response to supplied fluid pressure in excess of the predetermined value to effect the application through said by-pass passage means of supplied fluid pressure in excess of the predetermined value, and means on said one resiliently urged means responsive to an increase of the applied fluid pressure to another predetermined value in excess of the first named predetermined value thereof to establish a disabling force for moving said one resiliently urged means against its own force toward an inoperative position in said by-pass passage means providing unrestricted pressure fluid communication therethrough between the supplied and applied fluid pressures.

6. A control valve comprising a housing, a pair of resiliently urged means movable in said housing and controlling the application through said housing of fluid pressure supplied thereto, said resiliently urged means being movable in response to supplied fluid pressure of a predetermined value toward a pressure fluid flow interrupting position in said housing isolating the applied fluid pressure from the supplied fluid pressure, said resiliently urged means defining therebetween by-pass passage means for communicating the supplied and applied fluid pressures following movement of said resiliently urged means to the flow interrupting position, a first effective area on one of said resiliently urged means for subjection to the supplied fluid pressure, said one resiliently urged means being movable relative to the other thereof in response to supplied fluid pressure in excess of the predetermined value acting on said first area toward a position in said by-pass passage means communicating therethrough the supplied fluid pressure with the applied fluid pressure to effect an increase in the applied fluid pressure in excess of the predetermined value, a second effective area on said one resiliently urged means for subjection to applied fluid pressure and opposed to said first area, the increased applied fluid pressure acting on said second area to move said one resiliently urged means toward another position in said flow passage isolating the increased applied and supplied fluid pressures, and a third effective area on said one resiliently urged means additive to one of said first and second areas for subjection to the applied fluid pressure, said third area being responsive to increased applied fluid pressure having another predetermined value in excess of the first named predetermined value to urge said one resiliently urged means against its own force toward a position providing unrestricted communication between the supplied and applied fluid pressure through said by-pass passage means.

7. A control valve comprising a housing, resiliently urged means movable in said housing for controlling the application through said housing of fluid pressure supplied thereto, said resiliently urged means being movable in response to a predetermined supplied fluid pressure toward a position isolating the applied fluid pressure from the supplied fluid pressure, other resiliently urged means movable in said first named resiliently urged means and defining therewith by-pass passage means for communicating the supplied and applied fluid pressures when said first named resiliently urged means is in its isolating position, first and second opposed effective areas on said other resiliently urged means respectively responsive to the supplied and applied fluid pressures, said first area being responsive to supplied fluid pressure in excess of the predetermined value to establish a first force urging said other resiliently urged means against its own force toward an open position in said by-pass passage means and communicating therethrough the supplied fluid pressure with the applied fluid pressure to effect an increase in the applied fluid pressure and said second area being responsive to the increased applied fluid pressure to establish a second force in opposition to said first force urging said other resiliently urged means toward a closed position in said by-pass passage means isolating the applied fluid pressure from the supplied fluid pressure, and a third effective area on said other resiliently urged means responsive to applied fluid pressure and additive to said first area, said third area being responsive to applied fluid pressure less than another predetermined value predeterminately greater than the first named predetermined value to establish a third force additive to said first force for moving said resiliently urged means toward its open position and the third force being increased to a magnitude such that said third force alone overcomes that of said other resiliently urged means own force to maintain said other resiliently urged means in its fully open position when the applied fluid pressure is increased to said another value in excess of the other predetermined value.

8. A control valve comprising a housing, resiliently urged means movable in said housing and controlling the application through said housing of fluid pressure supplied thereto, said resiliently urged means being movable in response to supplied fluid pressure of a predetermined value toward a position in said housing isolating the applied fluid pressure from the supplied fluid pressure, and other means movable in said resiliently urged means for controlling communication between the supplied and applied fluid pressures when said resiliently urged means is in its isolating position including valve means, said valve means being movable in response to supplied fluid pressure in excess of the predetermined value toward a position establishing communication between the supplied and applied fluid pressures, and other resiliently urged means opposing movement of said valve means toward its communication establishing position including means responsive to applied fluid pressure having another predetermined value in excess of the first named predetermined value for urging said other resiliently urged means toward a disabled position unopposed to the movement of said valve means toward its communication establishing position.

9. The control valve according to claim 8, comprising passage means in said first named resiliently urged means having opposed ends subjected to the supplied and applied fluid pressures, said valve means and other resiliently urged means being movable in said passage means, and a valve seat on said first named resiliently urged means in circumscribing relation with said passage means between said opposed ends thereof, said other resiliently urged means normally urging said valve means into engagement with said valve seat closing said passage means to interrupt communication between the supplied and applied fluid pressures and said valve means also being movable in response to supplied fluid pressure in excess of the first named predetermined value toward a position disengaged from said valve seat opening said passage means to establish communication between the supplied and applied fluid pressures.

10. The control valve according to claim 8, wherein said other resiliently urged means comprises piston means movable in said first named resiliently urged means, said last named means defining an end portion on said piston means for driving engagement with said valve means and subjected to applied fluid pressure, another end portion on said piston means opposed to said first named end portion and subjected to the atmosphere, and resilient means engaged with said other end portion and urging said first named end portion toward driving engagement with said valve means.

11. The control valve according to claim 8, comprising opposed fluid pressure responsive areas on said valve means respectively responsive to the supplied and applied fluid pressures, one of said areas being responsive to supplied fluid pressure in excess of the first named predetermined value to establish a force for moving said valve means toward its communication establishing position against the force of said other resiliently urged means and the opposing force of the applied fluid pressure acting on the other of said areas, and a third fluid pressure responsive area on said other resiliently urged means additive to said one area and responsive to the applied fluid pressure, the applied fluid pressure in excess of the other predetermined value acting on said third area to establish the disabling force for moving said other resiliently urged means against its own force toward its disabled position.

12. A control valve comprising a housing having a pair of ports therein, resiliently urged means movable in said housing and controlling pressure fluid communication between said ports, said resiliently urged means being movable in response to a predetermined fluid pressure established at said ports toward a position interrupting pressure fluid communication between said ports, valve means movable in said resiliently urged means and controlling pressure fluid communication between said ports when said resiliently urged means is in its pressure fluid communication interrupting position, said valve means being movable in response to fluid pressure at one of said ports in excess of the predetermined fluid pressure toward a position establishing pressure fluid communication between said ports, other means movable in said resiliently urged means between an operative position in driving engagement with said valve means to oppose movement thereof toward its pressure fluid communication etsablishing position and an inoperative position unopposed to movement of said valve means, and spring means urging said other means toward its operative position, said other means being movable against said spring means toward its inoperative position in response to fluid pressure at said other port having another predetermined value in excess of the first named predetermined value.

13. A control valve comprising a housing having a pair of ports therein, resiliently urged means movable in said housing and controlling pressure fluid communication between said ports, said resiliently urged means being movable in response to a predetermined fluid pressure at said ports toward a position interrupting pressure fluid communication between said ports, means within said housing including said resiliently urged means defining by-pass passage means between said ports, and other means movable in said by-pass passage means for controlling pressure fluid communication therethrough between said ports when said resiliently urged means is in its pressure fluid communication interrupting position including valve means, piston means, an end portion on said piston for driving engagement with said valve means and subjected to fluid pressure at one of said ports, and spring means normally urging said piston means end portion into driving engagement with said valve means and urging said valve means toward a position closing said by-pass passage means to interrupt pressure fluid communication between said ports, said valve means being movable against said spring means in response to fluid pressure at the other of said ports in excess of the predetermined value toward an open position in said by-pass passage means establishing pressure fluid communication between said ports, and said piston means being movable relative to said valve means and against said spring means toward an inoperative position out of driving engagement with said valve means in response to fluid pressure at said one port in excess of another predetermined value predeterminately greater than the first named predetermined value acting on the effective area of said piston means end portion.

References Cited
UNITED STATES PATENTS

| | | | |
|---|---|---|---|
| 3,214,913 | 11/1965 | Hayman et al. | 137—493.6 X |
| 3,232,057 | 2/1966 | Kersting | 303—6 X |
| 3,252,740 | 5/1966 | Stelzer | 303—24 X |

FOREIGN PATENTS

| | | |
|---|---|---|
| 32,154 | 1/1909 | Sweden. |

HENRY T. KLINKSIEK, *Primary Examiner.*

M. CARY NELSON, *Examiner.*

R. J. MILLER, *Assistant Examiner.*

UNITED STATES PATENT OFFICE
CERTIFICATE OF CORRECTION

Patent No. 3,375,852                         April 2, 1968

Arthur N. Milster

It is certified that error appears in the above identified patent and that said Letters Patent are hereby corrected as shown below:

Column 8, line 67, after "said" insert -- second --.
Column 10, line 51, "defining-" should read -- defining --.

Signed and sealed this 19th day of August 1969.

(SEAL)
Attest:

Edward M. Fletcher, Jr.                     WILLIAM E. SCHUYLER, JR.
Attesting Officer                             Commissioner of Patents